United States Patent [19]
Pyrozyk

[11] Patent Number: 5,402,838
[45] Date of Patent: Apr. 4, 1995

[54] TIRE TRACTION APPARATUS

[75] Inventor: Ronald R. Pyrozyk, Penticton, Canada

[73] Assignee: Okanagan House Inc., Penticton, Canada

[21] Appl. No.: 154,418

[22] Filed: Nov. 19, 1993

[51] Int. Cl.6 ............................................. B60C 27/02
[52] U.S. Cl. .................................. 152/216; 152/233; 152/241; 152/513; 280/288.4
[58] Field of Search ............... 152/170, 513, 517, 501, 152/216, 233, 221, 225 C, 241; 280/288.4

[56] References Cited

U.S. PATENT DOCUMENTS

| | | | |
|---|---|---|---|
| 1,090,169 | 3/1914 | Savage | 152/180 |
| 1,159,320 | 11/1915 | Lashar | 152/372 |
| 2,913,034 | 11/1959 | Wall | 152/513 |
| 3,336,963 | 8/1967 | Iaquinta | 152/216 |
| 3,504,725 | 4/1970 | Fletcher et al. | 152/513 X |
| 4,338,988 | 7/1982 | Brooks et al. | 152/216 |
| 4,719,953 | 1/1988 | Norheim, Jr. | 152/216 |
| 5,071,684 | 12/1991 | Gewecke | 152/513 X |

FOREIGN PATENT DOCUMENTS 1002210 2/1957 Germany.

Primary Examiner—Michael W. Ball
Assistant Examiner—Francis J. Lorin
Attorney, Agent, or Firm—Bull, Housser & Tupper

[57] ABSTRACT

A tire traction apparatus for use on wheels having a rim and a tire where the rim has first and second upstanding, spaced apart side portions on opposite sides thereof, and outer facing braking surfaces thereon and the tire has first and second bead portions which cooperate with the first and second side portions to secure the tire to the rim. The apparatus includes a transversely extending member operable to extend transversely across the tire and includes first and second connecting devices cooperating with the tire for connecting the transversely extending member to opposite sides of the tire without interfering with the outer braking surfaces.

14 Claims, 4 Drawing Sheets

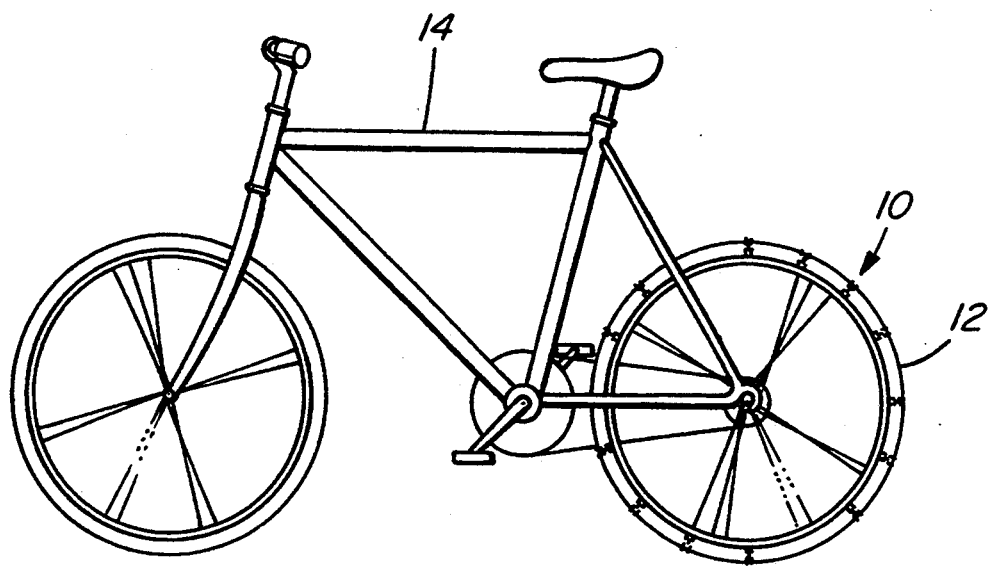
FIG. 1
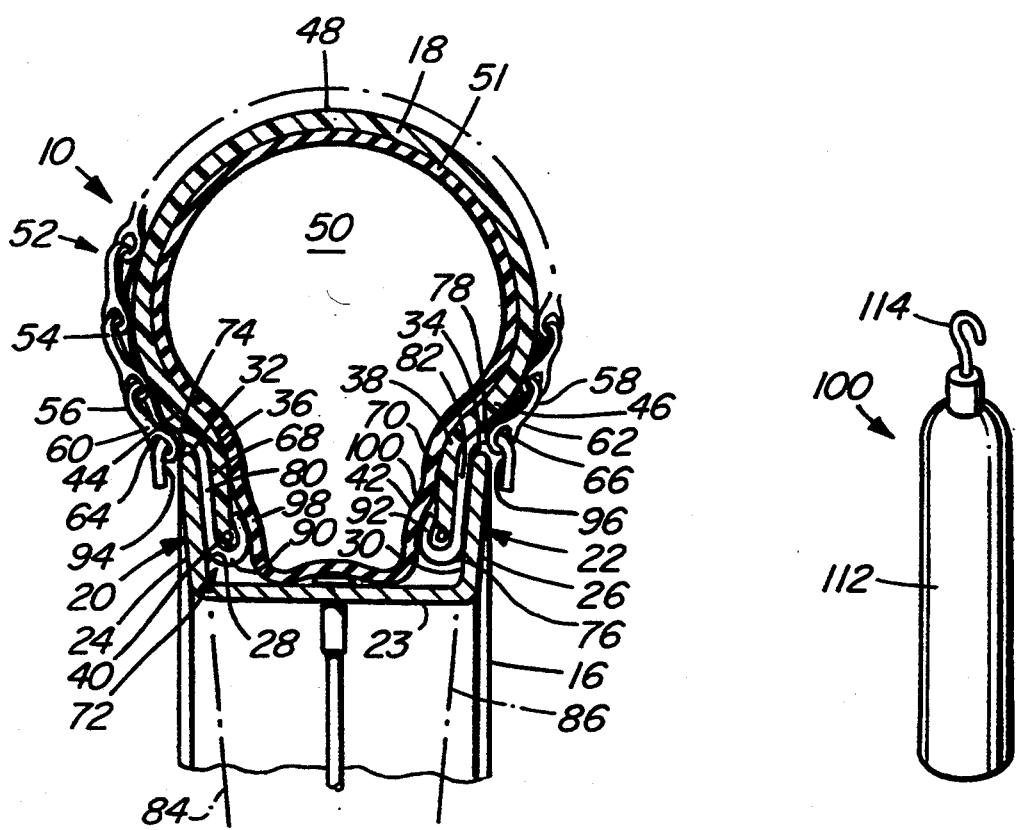
FIG. 2
FIG. 3

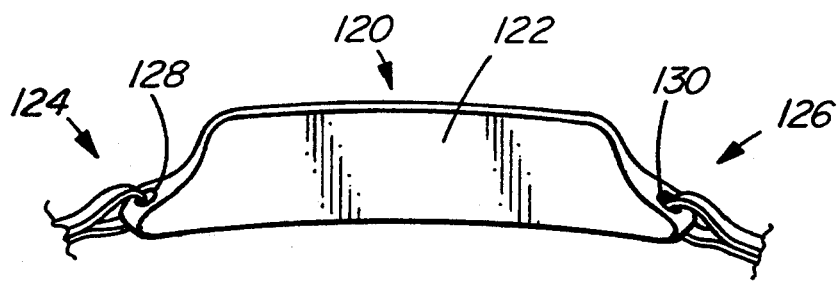
FIG. 6
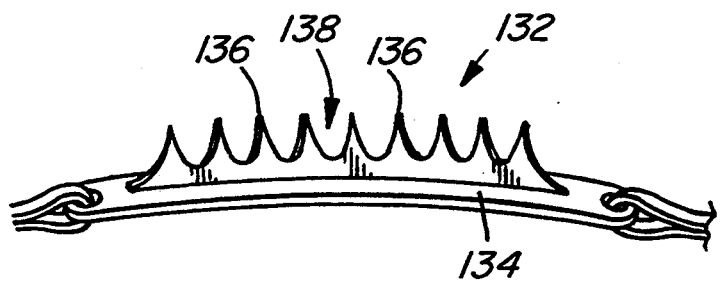
FIG. 7
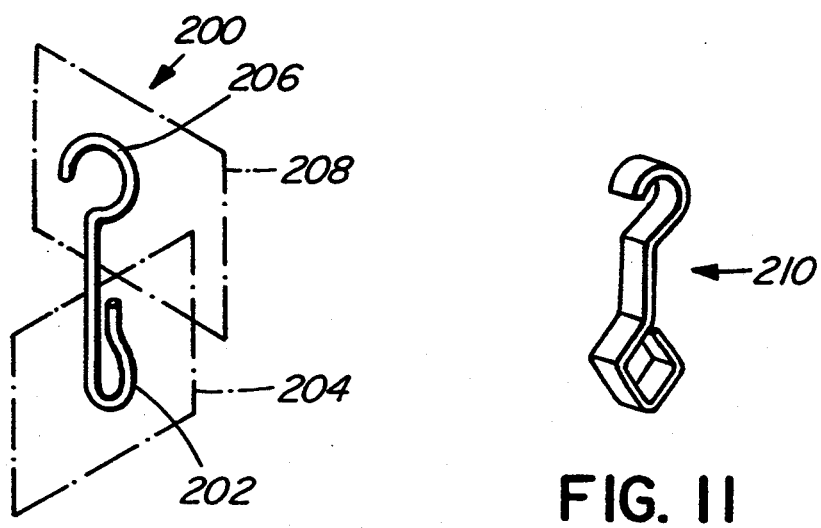
FIG. 10
FIG. 11

# TIRE TRACTION APPARATUS

BACKGROUND OF THE INVENTION

This invention relates to tire traction devices in general, and more particularly relates to tire traction devices for use on a bicycle or other mobile devices such as a wheel chair.

It is known in the art to install tire chains on a rear tire of a bicycle in order to improve traction. Conventional bicycle tire chains employ a pair of circumferentially extending chain portions with a plurality of transversely extending chain portions extending therebetween. To install conventional bicycle tire chains, the wheel upon which the chains are to be installed must be removed from the bicycle. The circumferentially extending portions of the chains are then positioned on opposite sides of the wheel and the transversely extending portions are positioned to extend across the tire. The wheel is then re-installed on the bicycle, however, the conventional chains are prone to interfere with the conventional caliper braking systems found on most bicycles, often rendering the braking system inoperative.

SUMMARY OF THE INVENTION

In accordance with one aspect the invention there is provided a tire traction apparatus for use on wheels having a rim and a tire where the rim has first and second upstanding, spaced apart side portions on opposite sides thereof, and outer facing braking surfaces thereon and the tire has first and second bead portions which cooperate with the first and second side portions to secure the tire to the rim. The apparatus includes a transversely extending member operable to extend transversely across the tire and includes first and second connecting devices cooperating with the tire for connecting the transversely extending member to opposite sides of the tire without interfering with the outer braking surfaces.

Preferably, each of the first and second connecting devices includes respective bead portion interfering means for interfering with at least one of the first and second bead portions of the tire.

Preferably, the interfering means includes a first receptacle operable to receive and hold a portion of at least one of the first and second bead portions and preferably, the first receptacle includes a bend portion for crimping to the bead portion.

Preferably, the transversely extending member has first and second opposite end portions operable to be disposed on opposite sides of the tire and preferably, each of the connecting devices includes a member having first and second opposite end portions and an intermediate portion between the first and second end portions. It is desirable that the second end portions of the first and second connecting devices include respective second receptacles for receiving and holding one of the first and second end portions of the transversely extending member.

Preferably, the intermediate portions of the connecting members extend between at least one of the first and second side portions of the rim and the first and second bead portions of the tire.

Optionally, the transversely extending member may include a plurality of links joined together or optionally, the transversely extending member may include a solid blade member.

As a further option, the transversely extending member may include a solid blade member having a plurality of laterally outwardly extending tooth portions, each tooth portion being spaced apart from an adjacent tooth portion by a space.

Alternatively, the first and second connecting members may be connected to a member inside the tire in spaced apart relation or the first and second connecting devices may be permanently secured to the tire.

According to another aspect of the invention there is provided a tire traction apparatus for wheels having a rim and a tire, the rim having first and second upstanding, spaced apart side portions on opposite sides thereof, and outer facing braking surfaces thereon, the tire having first and second bead portions which cooperate with the first and second side portions to secure the tire to the rim. The apparatus includes a transversely extending member operable to extend transversely across the tire, the transversely extending member having first and second opposite end portions. The apparatus further includes first and second connecting devices for connecting the transversely extending member to the first and second bead portions respectively, without interfering with the outer braking surfaces. The first and second connecting devices include first and second members, respectively, each of the first and second members having first and second opposite end portions and an intermediate portion disposed between the first and second opposite end portions. The first and second opposite end portions have first and second receptacles respectively, the first receptacle being operable to receive and hold a portion of a bead portion of the tire, the intermediate portion extending between the bead portion and an adjacent side portion of the rim and the second receptacle being operable to receive and hold a respective end portion of the transversely extending member.

According to another aspect of the invention, there is provided a tire traction apparatus for use on wheels having a rim with first and second upstanding, spaced apart side portions on opposite sides thereof, the side portions having outer facing braking surfaces, and, a tire having first and second bead portions which cooperate with the first and second side portions to secure the tire to the rim. The apparatus includes a plurality of transversely extending members, each member being operable to extend transversely across the tire and connected thereto by a plurality of connecting devices cooperating with the tire for individually connecting each of the transversely extending members to opposite sides of the tire without interfering with the outer braking surfaces.

According to another aspect of the invention there is provided an apparatus including a bicycle having a wheel, the wheel having a rim with first and second upstanding, spaced apart side portions on opposite sides thereof, the side portions having outer facing braking surfaces thereon, the tire having first and second bead portions which cooperate with the first and second side portions to secure the tire to the rim. The apparatus further includes a transversely extending member operable to extend transversely across the tire and include first and second connecting devices cooperating with the tire for connecting the transversely extending member to opposite sides of the tire without interfering with the outer braking surfaces.

According to another aspect of the invention there is provided a method of improving traction on a wheel having a rim with first and second upstanding, spaced apart side portions on opposite sides thereof, and a tire having first and second bead portions which cooperate with the first and second side portions to secure the tire to the rim. The method includes the steps of:

a) on a first side of said wheel, inserting a first end portion of a first connector between the bead portion of the tire and the first side portion;
b) receiving said bead portion in a first receptacle on the first end portion of the first connector; while permitting an intermediate portion of the first connector to extend between the bead portion and the first upstanding wall portion such that a second end portion of the first connector is accessible adjacent the first wall portion and adjacent the tire;
c) connecting a first end portion of a transversely extending member to the second end portion;
d) repeating the steps above for a second connector on a side of said wheel opposite said first side, such that a second end portion of the transversely extending member is connected to a second connector on an opposite side of said wheel such that said transversely extending member extends generally transversely across the tire.

BRIEF DESCRIPTION OF THE DRAWINGS

In drawings which illustrate embodiments of the invention,

FIG. 1 is a side view of a bicycle upon which a plurality of apparatuses according to a first embodiment of the invention are installed.

FIG. 2 is a cross-sectional view of a wheel portion of the tire of FIG. 1;

FIG. 3 is a side view of a hook tool for use in installing the apparatus according to the invention;

FIG. 6 is an oblique view of a transversely extending member according to a second embodiment of the invention;

FIG. 7 is an oblique view of a transversely extending member according to a third embodiment of the invention;

FIG. 10 is a perspective view of a connecting member according to a sixth embodiment of the invention; and FIG. 11 is an oblique view of a connecting member according to a seventh embodiment of the invention.

DETAILED DESCRIPTION

Figure 4:
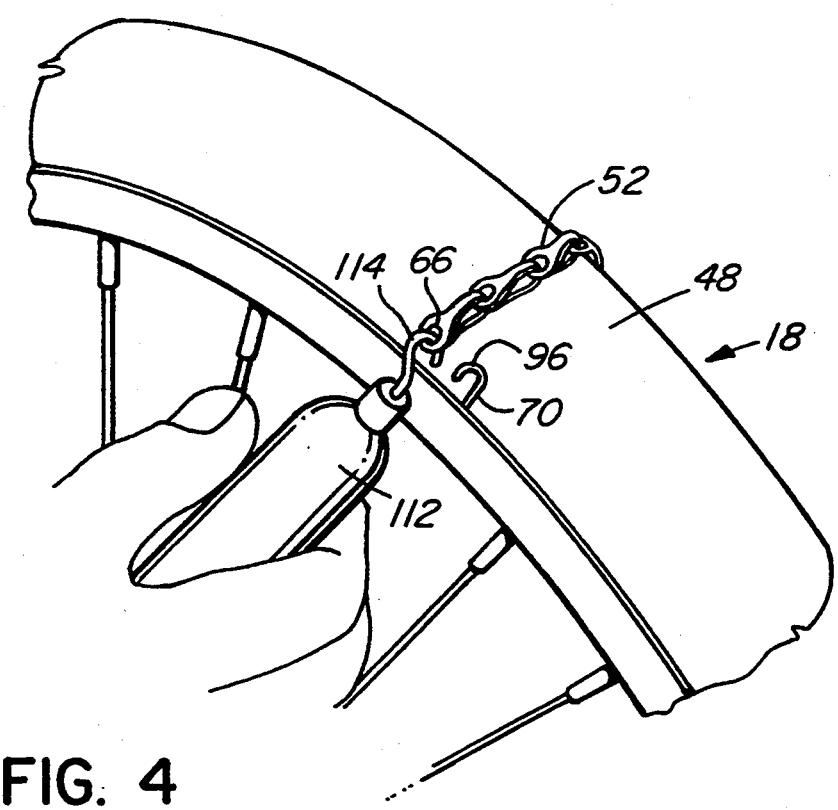
FIG. 4 is a partial oblique view of the tool of FIG. 3 shown in use, installing the apparatus of FIG. 1.

Referring to FIG. 1, an apparatus according to a first embodiment of the invention is shown generally at 10 mounted on a wheel 12 of a bicycle 14.

Rim

Referring to FIG. 2, the wheel is conventional and includes a rim 16 and a tire 18. The rim has first and second upstanding, spaced apart side portions 20 and 22 connected together by a spoke connecting portion 23.

The side portions have first and second outer braking surfaces 24 and 26, inner rim surfaces 28 and 30 and top edge portions 32 and 34.

Tire

The tire 18 has first and second bead portions 36 and 38 having first and second bead edges 40 and 42 respectively. The tire also has first and second sidewall portions 44 and 46 which are connected to, and extend outwardly from the first and second bead portions 36 and 38. A tread portion 48 extends between the first and second sidewall portions 44 and 46. The first and second bead portions 36 and 38 cooperate with the first and second side portions 20 and 22 to secure the tire 18 to the rim 16. The rim 16 and tire 18 define an interior portion of the tire shown generally at 50, within which a conventional inner tube 51 is situated.

The apparatus 10 includes a transversely extending member shown generally at 52. In this embodiment, the transversely extending member includes a plurality of chain links 54 coupled together to form a length of chain having first and second end portions 56 and 58. The first end portion includes a first end link 60 and the second end portion includes a second end link 62. The first and second end links have first and second openings 64 and 66 respectively. A sufficient number of links are connected between the first and second end links such that the first and second opposite end portions 56 and 58 are disposed on opposite sides of the tire 18 and such that the opposite end portions are spaced apart sufficiently to permit them to simultaneously be disposed adjacent the top edge portions 32 and 34 respectively while the remaining chain links extend transversely across the sidewall portions 44 and 46 and tread portion 48.

The transversely extending member 52 is secured to the tire 18 by first and second connecting members 68 and 70 which connect to the first and second opposite end portions 56 and 58. The first and second connecting members are formed from respective pieces of steel wire having a circular cross-section and sufficient strength and resilience that they retain their shape under tension as described below. The first and second connecting members 68 and 70 have first and second opposite end portions 72, 74 and 76, 78 respectively, with respective intermediate portions 80 and 82 therebetween. The first and second connecting members have respective longitudinal axes 84 and 86 respectively.

The first and second end portions 72, 74 and 76, 78 are formed into first 90, 92 and second 94, 96 coplanar hook portions which face in opposite directions relative to respective longitudinal axes 84 and 86 respectively. The first hook portions 90, 92 have respective inwardly facing bend portions 98 and 100 which curl inwardly to form receptacles for holding respective bead edges of the tire. The inward curl reduces the risk of damage to the inner tube 51 within the tire. The second hook portions 94, 96 are smoothly curved. The intermediate portions 80 and 82 are circular in cross section.

In use, the connecting members 68 and 70 are disposed in an orientation such that respective first hook portions 90 and 92 extend in the space 50 while the second hook portions 94 and 96 extend exterior to the tire 18, adjacent respective sidewall portions 44 and 46 of the tire. In this position, the first bead edges 40 and 42 are received in respective first hook portions 90 and 92 and the second hook portions 94 and 96 are received in the first and second end openings 64 and 66 respectively of the first and second end links 60 and 62. At the same time, the intermediate portions 80 and 82 extend between respective side portions 20 and 22 of the rim and tire bead portions 36 and 38. Therefore, it is preferable to keep the intermediate portions as small as possible in cross-sectional area to minimize any interference with the fit of the tire to the rim. The first and second bead edges 40 and 42 are tightly crimped by respective bend portions 98 and 100 and are further held in respective first hook portions 90 and 92 by tension in the transversely extending member, this also acts to hold the second hook portions 94 and 96 away from the first and second outer braking surfaces 24 and 26 such that these surfaces are kept free and clear of any obstructions which could interfere with the operation of the brakes of the bicycle. It is ensured that the first and second connecting members 68 and 70 are kept clear of the outer braking surfaces 24 and 26 when under tension, by selecting the length of the intermediate portions 80 and 82 to be slightly longer than the distance between the bead edges 40 and 42 and the first and second top edge portions 32 and 34.

Operation

Still referring to FIG. 2, to install the apparatus, the inner tube 51 is first deflated to permit the first and second bead portions 36 and 38 to be separated and pushed inwardly from the first and second side portions 20 and 22. Then, the first and second connecting members 68 and 70 are inserted between respective bead portions 36, 38 and adjacent side portions 20 and 22 such that respective bead edges 40 and 42 are received in respective first hook portions 90 and 92 and such that the second hook portions 94 and 96 extend adjacent respective sidewall portions 44 and 46 of the tire 18.

The bend portions 98, 100 in the first hook portions 90, 92 act to firmly grip the first and second bead portions 36 and 38 such that the first and second connecting members are securely fixed to the tire. The first hook portions act as respective receptacles for receiving the first and second bead portions 36 and 38 and as bead portion interfering means for interfering with the first and second bead portions to prevent the first and second connecting members 68 and 70 from separating from the tire 18.

The inner tube 51 is then inflated whereupon the intermediate portions 80 and 82 of the first and second connecting members 68 and 70 become squeezed between respective bead portions 36, 38 and upstanding side portions 20 and 22 such that the second hook portions 94 and 96 are disposed adjacent respective sidewall portions 44 and 46 of the tire 18.

When the inner tube 51 has been inflated to normal operating pressure, the transversely extending member 52 is arranged to extend transversely across the tire 18 and the second hook portions 94 and 96 are placed in the first and second end openings 64 and 66 respectively. The transversely extending member is thereby secured to the tire.

Referring to FIG. 3, to facilitate the insertion of the second hook portion 96 of the second connecting member 70 into the second end opening 66 there may be employed a tool such as shown at 100. The tool includes a handle portion 112 with a hook portion 114 secured thereto. The hook portion is dimensioned such that it is operable to be received in the second end opening 66 at the same time as the second hook portion 96 of the second connecting member 70.

Figure 5:
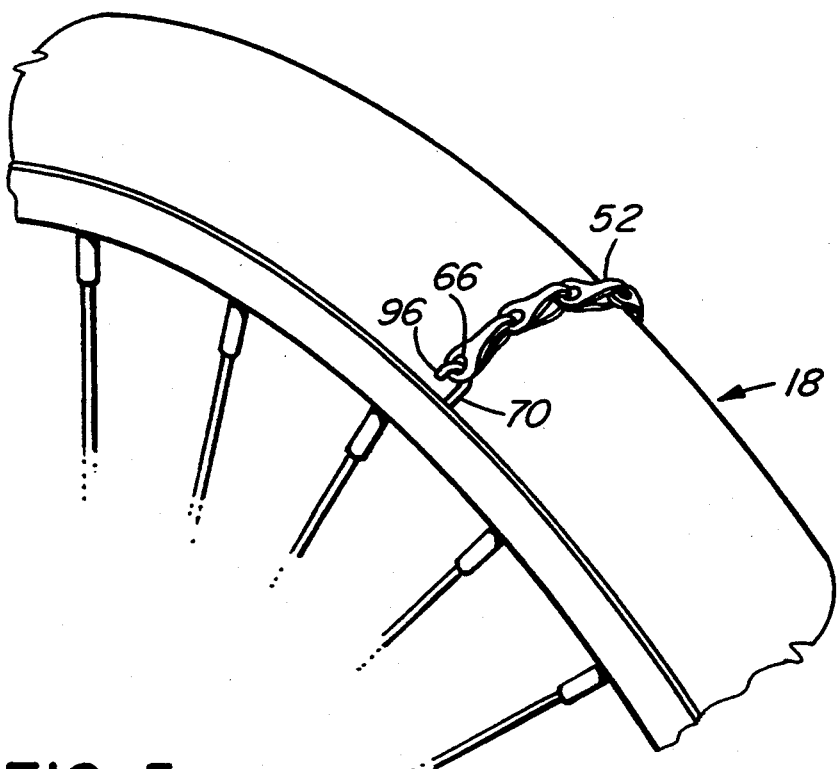
FIG. 5 appears on the same sheet as FIG. 1 and is a partial oblique view of a portion of the wheel of FIG. 1 with the apparatus of FIG. 1 installed thereon.

Referring to FIG. 4, to use the tool, the handle portion 112 is gripped by a user and the hook portion 114 is inserted in the second end opening 66. The user then pulls on the handle to apply tension to the transversely extending member 52, with sufficient force, if necessary, to deform the tread portion 48 of the tire 18 until the second hook portion 96 of the second connecting member 70 can be inserted into the second end opening 66 as shown in FIG. 5.

For a bicycle 32, apparatuses of the type described above would be installed at equal spaced intervals along the circumference of the wheel as shown in FIG. 1. The chain link transversely extending member described above is not intended for use on pavement, but rather to enhance traction on snow and ice.

In effect therefore, there is provided a method of improving traction on a wheel having a rim with first and second upstanding, spaced apart side portions on opposite sides thereof and a tire having first and second bead portions which cooperate with the first and second side portions to secure the tire to the rim, the method including the steps of:
 a) on a first side of said wheel, inserting a first end portion of a first connector between the first bead portion of the tire and first side portion;
 b) receiving said bead portion in a first receptacle on said first end portion of the first connector; while permitting an intermediate portion of the first connector to extend between the first bead portion and the first upstanding wall portion such that a second end portion of the first connector is accessible adjacent the first wall portion and adjacent the tire;
 c) connecting a first end portion of a transversely extending member to the second end portion;
 d) repeating the steps above for a second connector on a side of said wheel opposite the first side, such that a second end portion of the transversely extending member is connected to second connector on an opposite side of said wheel such that said transversely extending member extends generally transversely across the tire.

Alternatives

Referring to FIG. 6, a transversely extending member according to a second embodiment of the invention is shown generally at 120. The transversely extending member 120 includes a flexible, solid blade member 122 having first and second opposite end portions 124 and 126 with first and second openings 128 and 130 respectively which are operable to cooperate with the second hook portions 94 and 96 respectively of the first and second connecting members 68 and 70 shown in FIG. 2. The link according to this embodiment is intended for use in sand and other loose materials.

Referring to FIG. 7, a transversely extending member according to a third embodiment of the invention is shown generally at 132. The member includes a solid, flexible blade member 134 having a plurality of laterally outwardly extending tooth portions 136, each tooth portion being spaced apart from an adjacent tooth portion by a respective space 138. The member according to this embodiment is intended for use in wet grasses and mud.

Figure 8:
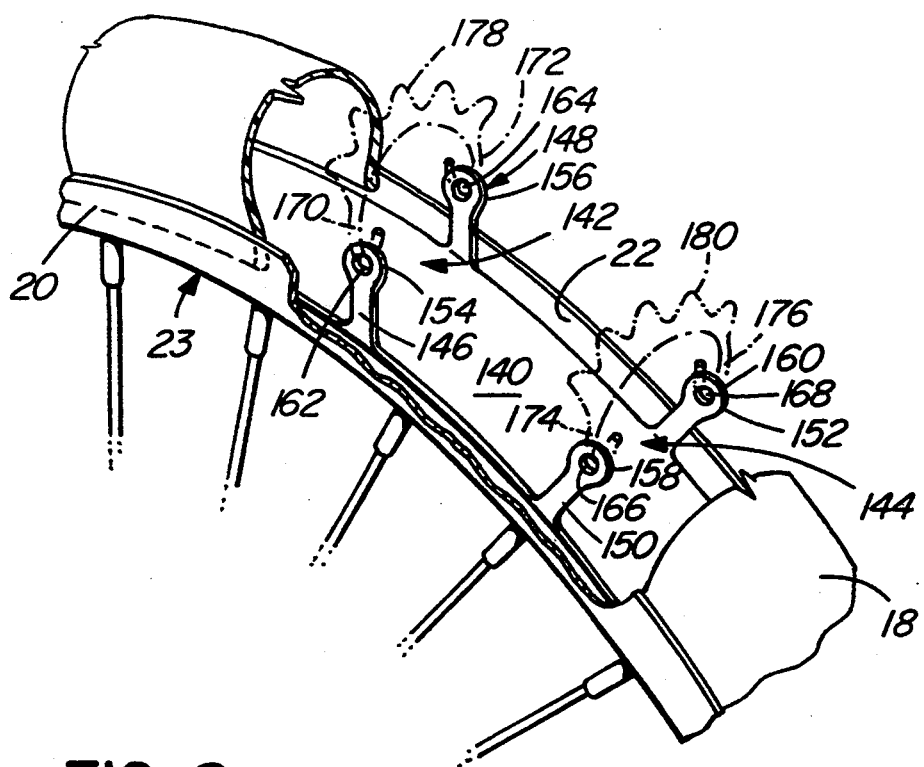
FIG. 8 appears on the same sheet as FIG. 4 and is an oblique, partially fragmented view of a portion of a wheel upon which an apparatus according to a fourth embodiment of the invention is installed.

Referring to FIG. 8, in a fourth alternative embodiment of the invention, the connecting members are replaced by a fabric member 140 having an annular shape with a diameter approximately equal to the diameter of the tire 18. The fabric member has a plurality of spaced apart pairs 142, 144 of spaced apart radially outwardly extending tabs 146, 148 and 150, 152. The circular fabric member is placed inside the tire, between the spoke connecting portion 23, and the inner tube 51 in the space 50 between the first and second side portions 20 and 22 such that the pairs of tabs extend outwardly between the bead portions (36 and 38, not shown in FIG. 8) and the side portions 20 and 22. Each of the tabs 146-152 has a respective distal end portion 154, 156, 158 and 160, each having a respective opening 162, 164, 166 and 168 for connecting to a respective end portion of a respective C-shaped wire hook 170, 172, 174, 176 for holding across the tire 18 a respective transversely extending member 178, 180 according to any of the above embodiments. Use of the C-shaped wire hooks 170, 172, 174 and 176 may be avoided by forming the first and second end portions of the transversely extending member with similar hook portions (not shown).

Figure 9:
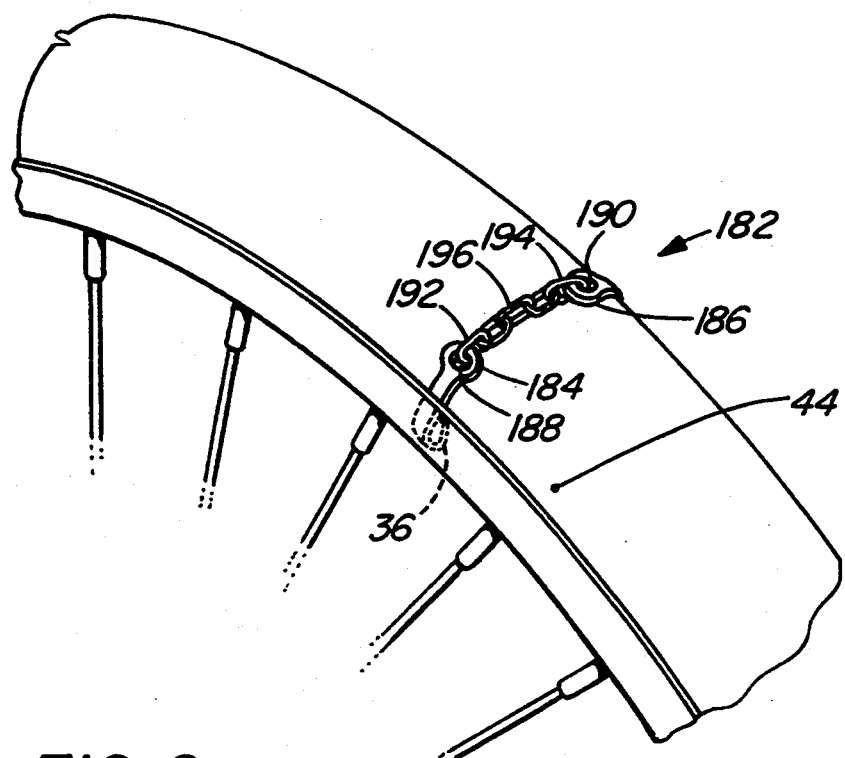
FIG. 9 is an oblique view of a portion of a wheel upon which an apparatus according to a fifth embodiment of the invention is installed.

Referring to FIG. 9, a fifth alternative embodiment of the invention is shown generally at 182. In this embodiment, the first and second connecting members are replaced by respective rubber fabric members 184 and 186 which are adhesively permanently secured to the bead portions 36 (and 38 not shown) inside the tire, at equally spaced intervals along the circumference of the tire. Each fabric member extends from a respective bead edges 40 and 42, between respective side portions 20 and 22 of the rim and respective bead portions 36 and 38 to positions adjacent respective sidewall portions 44 (46 not shown) of the tire 184, 186 and has a respective opening 188, 190 operable to connect to a respective end portion of a respective C-shaped wire hook 192, 194 for holding across the tire 18, a transversely extending member 196 according to any of the above embodiments. Alternatively, the C-shaped hooks 192 and 194 may be replaced as described above.

Referring to FIG. 10, a connecting member according to a sixth alternative embodiment is shown generally at 200. In this embodiment, the member includes a first hook portion 202 which lies in a first plane 204 and has a second hook portion 206 which lies in a second plane 208 disposed at right angles to the first plane 204. An advantage of this connecting member is that the second hook portion 206 is operable to lie flush against the sidewall of the tire and therefore has even less chance of interfering with the brakes of the bicycle.

Referring to FIG. 11, a connecting member according to a seventh alternative embodiment is shown generally at 210. In this embodiment, the connecting member has the same shape as the connecting member shown in FIG. 2 but the member is formed from a length of ⅛" flat stock steel rather than the steel wire as shown in FIG. 2.

It will be appreciated that the connecting members of any of the above embodiments may remain installed on the wheel, whether or not the transversely extending members are installed. Specific transversely extending members may be selected and installed to suit the surface over which the bicycle is to be driven. A plurality of different transversely extending members may be stored on the bicycle, perhaps in a small storage container similar to a water bottle, and installed as required. Clearly, it is not necessary to remove the wheel for installation or removal of the transversely extending members from the wheel, rather installation and removal can be accomplished with the wheel on the bike. Furthermore, there is no interference with conventional caliper brakes since the braking surfaces of the rim are not obstructed.

It will be appreciated that the use of the apparatuses disclosed herein is not limited to bicycles and wheel chairs but rather the apparatus may also be used on motorcycles, garden tractors, fork lifts or other vehicles with wheels which employ a tire and rim.

While specific embodiments of the invention have been described and illustrated, such embodiments should be considered illustrative of the invention only and not as limiting the invention as construed in accordance with the accompanying claims.

What is claimed is:

1. A tire traction apparatus for use on wheels having a rim with first and second upstanding, spaced apart side portions, the side portions having outer facing braking surfaces and, a tire having first and second bead portions which cooperate with said first and second side portions to secure the tire to the rim and having a tread portion extending between the first and second side portions, the apparatus including:
   a) a transversely extending member operable to extend transversely across the tread portion of the tire, the transversely extending member having first and second opposite end portions;
   b) first and second connecting means for connecting the transversely extending member to the first and second bead portions respectively, without interfering with the outer braking surfaces the first and second connecting means including first and second members respectively, each of said first and second members having:
      i) first and second opposite end portions and an intermediate portion disposed between said first and second opposite end portions, the first and second opposite end portions having first and second receptacles respectively, the first receptacle being operable to receive and hold a portion of a bead portion of said tire, the intermediate portion extending between said bead portion and an adjacent side portion of the rim and the second receptacle being operable to receive and hold a respective end portion of said transversely extending member such that said tire is gripped between the first and second receptacles and the transversely extending member.

2. A method of improving traction on a wheel having a rim with first and second upstanding, spaced apart side portions and a tire having first and second bead portions which cooperate with said first and second side portions to secure the tire to the rim and having a tread portion extending between the first and second side portions, the method including the steps of:
   a) on a first side of said wheel, inserting a first end portion of a first connector between the first bead portion of the tire and the first side portion;
   b) receiving said first bead portion in a first receptacle on the first end portion of the first connector; while permitting an intermediate portion of the first connector to extend between the bead portion and the first upstanding side portion such that a second end portion of the first connector is accessible adjacent the first side portion and adjacent the tire;
   c) connecting a first end portion of a transversely extending member to the second end portion;
   d) repeating the steps above for a second connector on a side of said wheel opposite said first side, such that a second end portion of the transversely extending member is connected to the second connector on an opposite side of said wheel such that said transversely extending member is secured generally transversely across the tread portion of the tire and such that said tire is gripped between respective receptacles on the connectors and the transversely extending member.

3. A tire traction apparatus for use on wheels having a rim with first and second upstanding, spaced apart side portions and a tire having first and second tire bead portions and a tread portion extending therebetween, the first and second bead portions cooperating with said first and second side portions to secure the tire to the rim, the apparatus including:
  a) a transversely extending member having first and second opposite end portions, the transversely extending member being operable to extend transversely across the tread portion of the tire such that said first and second end portions are disposed on opposite sides of the tire; and
  b) first and second connectors for connecting the transversely extending member to the tire, each of said first and second connecting members including:
    i) first and second opposite end portions; and
    ii) an intermediate portion extending between said first and second opposite end portions;
  said first end portion having a bead interfering portion, at least one of said tire bead portions interfering with said bead interfering portion to prevent said connecting member from separating from the tire, said intermediate portion being operable to extend between at least one of the tire bead portions and the adjacent first or second upstanding spaced apart side portion of the rim and the second end portion being operable to hook onto one of said first and second opposite end portions of said transversely extending member, whereby the tire is gripped between the bead interfering portions and the transversely extending member, and wherein each of said respective bead interfering portions includes a first hook portion operable to hook onto the bead portion of the tire.

4. An apparatus as claimed in claim 3 wherein said transversely extending member includes a plurality of links joined together.

5. An apparatus as claimed in claim 3 wherein said transversely extending member includes a solid blade member.

6. An apparatus as claimed in claim 3 wherein said transversely extending member includes a solid blade member having a plurality of laterally outwardly extending tooth portions, each tooth portion being spaced apart from an adjacent tooth portion by a space.

7. An apparatus as claimed in claim 3 wherein said first hook portion has an inwardly facing bend portion which curls inwardly to form a receptacle for firmly gripping the bead portion.

8. An apparatus as claimed in claim 3 wherein said second end portion includes a second hook portion.

9. An apparatus as claimed in claim 8 wherein said first and second hook portions are coplanar.

10. An apparatus as claimed in claim 9 wherein said first and second hook portions face in opposite directions.

11. An apparatus as claimed in claim 8 wherein said second hook portion is smoothly curved.

12. An apparatus as claimed in claim 3 wherein said first and second end portions include first and second non-coplanar hook portions respectively, lying in first and second planes disposed at right angles to each other.

13. An apparatus as claimed in claim 3 wherein said intermediate portion is circular in cross section.

14. An apparatus comprising:
  a) a bicycle having a wheel, the wheel having a rim with first and second upstanding, spaced apart side portions the side portions having outer facing braking surfaces, and, a tire having first and second bead portions which cooperate with said first and second side portions to secure the tire to the rim;
  b) a transversely extending member having first and second opposite end portions, the transversely extending member being operable to extend transversely across the tread portion of the tire such that said first and second end portions are disposed on opposite sides of the tire; and
  c) first and second connectors for connecting the transversely extending member to the tire, each of said first and second connecting members including:
    i) first and second opposite end portions; and
    ii) an intermediate portion extending between said first and second opposite end portions;
  said first end portion having a bead interfering portion, at least one of said tire bead portions interfering with said bead interfering portion to prevent said connecting member from separating from the tire, said intermediate portion being operable to extend between at least one of the tire bead portions and the adjacent first or second upstanding spaced apart side portion of the rim and the second end portion being operable to hook onto one of said first and second opposite end portions of said transversely extending member, whereby the tire is gripped between the bead interfering portions and the transversely extending member and, wherein at least one of the bead interfering portions comprises a receptacle to receive and hold a portion of a bead portion of said tire.

* * * * *